US010340066B2

(12) United States Patent
Wriedt et al.

(10) Patent No.: US 10,340,066 B2

(45) Date of Patent: Jul. 2, 2019

(54) METHOD AND SYSTEM FOR CONTROLLED NANOSTRUCTURING OF NANOMAGNETS

(71) Applicants: Mario Wriedt, Potsdam, NY (US); Darpandeep Aulakh, Amritsar (IN); Joshua Pyser, Dalton, MA (US); Kim R. Dunbar, College Station, TX (US); Xuan Zhang, College Station, TX (US)

(72) Inventors: Mario Wriedt, Potsdam, NY (US); Darpandeep Aulakh, Amritsar (IN); Joshua Pyser, Dalton, MA (US); Kim R. Dunbar, College Station, TX (US); Xuan Zhang, College Station, TX (US)

(73) Assignee: Clarkson University, Potsdam, NY (US)

( * ) Notice: Subject to any disclaimer, the term of this patent is extended or adjusted under 35 U.S.C. 154(b) by 622 days.

(21) Appl. No.: 15/161,828

(22) Filed: May 23, 2016

(65) Prior Publication Data

US 2016/0343488 A1 Nov. 24, 2016

Related U.S. Application Data

(60) Provisional application No. 62/165,326, filed on May 22, 2015.

(51) Int. Cl.

*H01F 1/42* (2006.01)

*C07F 5/06* (2006.01)

(52) U.S. Cl.

CPC .................................... *H01F 1/42* (2013.01)

(58) Field of Classification Search

CPC .. C07F 5/06; C07F 5/061; C07F 5/069; H01F 1/42

See application file for complete search history.

(56) References Cited

PUBLICATIONS

Lee. One-pot synthesis of magnetic particle-embedded porous carbon composites from metal-organic frameworks and their sorption properties. Chem. Commun., 2014, 50, 5476-5479 (Year: 2014).*

Katsenis. Metal-Organic Frameworks from Single-Molecule Magnets. Metal-Organic Framework Materials. p. 245-258. 2014 John Wiley and Sons Ltd (Year: 2014).*

* cited by examiner

*Primary Examiner* — Matthew E. Hoban

(74) *Attorney, Agent, or Firm* — Bond Schoeneck & King, PLLC; George McGuire

(57) ABSTRACT

A composite magnetic matrix comprising a porous metal-organic framework (MOF) and a plurality of molecular magnets, where a plurality of pores of the MOF each comprise one of the plurality of molecular magnets, and where the each of the plurality of molecular magnets retains its magnetic properties in the matrix. The molecular magnet may be, for example, a single-molecule magnet or a single-chain magnet. For example, the composite magnetic matrix $Mn_{12}Ac$@MOF comprises $Mn_{12}O_{12}(O_2CCH_3)_{16}(OH_2)_4$ ($Mn_{12}Ac$) as the single-molecule magnet and $[Al(OH)(SDC)]_n$ ($H_2SDC$=4,4'-stilbenedicarboxylic acid) (CYCU-3) as the porous metal-organic framework.

20 Claims, 8 Drawing Sheets

METHOD AND SYSTEM FOR CONTROLLED NANOSTRUCTURING OF NANOMAGNETS

CROSS-REFERENCE TO RELATED APPLICATION

This application claims priority to U.S. Provisional Patent Application Ser. No. 62/165,326, filed on May 22, 2015 and entitled "Controlled Nanostructuring of Nanomagnets as Platform for the Design of Molecular Spintronics," the entire disclosure of which is incorporated herein by reference.

FIELD OF THE INVENTION

The present disclosure relates generally to molecular magnets, and more particularly to the incorporation of molecular magnets into a metal-organic framework matrix.

BACKGROUND

Next-generation computer technologies will require ultra-high-density data storage devices and quantum computing based on isolated spin-carriers, a field known as molecular spintronics. Single-molecule magnets (SMMs) have shown great potential for such applications. SMMs are a class of metalorganic compounds that can be magnetized in a magnetic field and exhibit magnetic behavior after the magnetic field is removed. The molecules possess intrinsic angular momentum, or spin, this is directional (either up or down). Their unique magnetic properties enable SMMs to be used in spintronics for switching from total spin up to total spin down at the molecular level, and therefore each molecule can be used as a magnetic bit of information.

The combination of a large spin ground state and high axial magnetic anisotropy in SMMs results in a barrier for the spin reversal, and therefore, the observation of slow magnetization relaxation rates below a threshold temperature value, attributed to purely molecular origin rather than long-range ordering. These characteristics enable the smallest data storage element to be as tiny as a single molecule, which would represent a breakthrough from the empirical Kryder's law, predicting a doubling of the data storage density every 13 months. The current maximum density to date is approximately 200 Gbit $cm^{-2}$, whereas the upper limit by using single molecules is predicted to be 30 Tbit $cm^{-2}$.

Practical applications of SMMs, however, require their organization into 2D or 3D networks to allow for read-and-write processes, which is a challenge given that SMM molecules often decompose under conditions required to obtain ordered arrays. For example, they need to be protected from the environment to retain their unique magnetic properties.

In general, lithographic techniques are well-adapted to the goal of isolating nanostructures of a few hundred molecules, but to attain the ultimate density one would have to rely on self-assembly processes of these molecules. Several approaches to the nanostructuring of SMMs have been analyzed, including association on surfaces, as well as incorporation into carbon-nanotubes and meso-porous silicas. In each instance, the nanostructures are restricted to a more short-range order and raise questions regarding stability and processability.

Similar to SMMs, single-chain magnets (SCMs) have shown potential for spintronics and other applications. SCMs are a class of one-dimensional polymeric coordination compounds with slow relaxation of the magnetization and magnetic hysteresis. SCMs typically have a large uniaxial magnetic anisotropy and strong intrachain interactions. For applications where two- or three-dimensional organization is undesirable, the chains are sufficiently isolated to prevent such organization. However, the isolation and organization of SCMs is still a subject of intense study, and there is a continued need for methods and systems that eliminate, prevent, and/or reduce inter-chain interactions among SCMs.

Accordingly, there is a continued need for controlled long-range organization of molecular magnets in different dimensionality architectures while remaining in a protected chemical environment.

SUMMARY OF THE INVENTION

The present disclosure is directed to the use of metal-organic frameworks (MOFs) to couple SMMs and/or SCMs to the macroscopic world. More specifically, the disclosure is directed to the incorporation and/or SCMs of SMMs into a MOF matrix, yielding a new nanostructured composite material that combines key SMM and/or SCMs properties with the functional properties of MOFs. Metal-organic frameworks are crystalline porous materials composed of metal clusters connected by polytopic organic linkers. Due to their well-ordered multidimensional cavities, MOFs have the potential to be hosts to achieve a precise long-range assembly of guest molecules for the fabrication of functional hybrid magnetic materials. Indeed, MOFs have been shown to be candidates for various composite and device fabrications and can serve as a container for nanoparticles which constitutes a physical bridge between the nanoscopic and macroscopic worlds.

According to an aspect is a composite magnetic matrix comprising: (i) a porous metal-organic framework (MOF); and (ii) a plurality of molecular magnets, wherein a plurality of pores of the MOF each comprise one of the plurality of molecular magnets, and wherein the each of the plurality of molecular magnets retains its magnetic properties in the matrix.

According to an embodiment, the MOF is [Al(OH)(SDC)] ($H_2SDC$=4,4'-stilbenedicarboxylic acid) (CYCU-3)

According to an embodiment, the molecular magnet is a single-molecule magnet.

According to an embodiment, the single-molecule magnet is $Mn_{12}O_{12}(O_2CCH_3)_{16}(OH_2)_4$.

According to an embodiment, the molecular magnet is a single-chain magnet.

According to an aspect is a material comprising a composite magnetic matrix, the composite magnetic matrix comprising: (i) a porous metal-organic framework (MOF); and (ii) a plurality of molecular magnets, wherein a plurality of pores of the MOF each comprise one of the plurality of molecular magnets, and wherein the each of the plurality of molecular magnets retains its magnetic properties in the matrix.

According to an aspect is a method for organizing a plurality of molecular magnets into an ordered matrix. The method includes the steps of: providing a porous metal-organic framework (MOF); and combining the MOF with the plurality of molecular magnets, wherein the each of the plurality of molecular magnets retains its magnetic properties in the matrix.

According to an aspect is a method for preparing a composite magnetic matrix comprising a porous metal-organic framework (MOF) and a plurality of molecular magnets. The method includes the steps of: forming a first reaction mixture comprising the MOF and the plurality of molecular magnets; and incubating the first reaction mixture for a period of time sufficient for organization of the composite magnetic matrix.

According to an embodiment, the first reaction mixture comprises a solvent. According to an embodiment, the solvent is acetonitrile. According to an embodiment, the method further comprises the step of removing the solvent from the reaction mixture after organization of the composite magnetic matrix. According to an embodiment, the step of removing the solvent from the reaction mixture comprises filtration.

According to an embodiment, the composite magnetic matrix is washed with a solvent to remove any of the plurality of molecular magnets not organized into the matrix.

According to an embodiment, the first reaction mixture is incubated at room temperature.

According to an aspect is a method for preparing a composite magnetic matrix comprising a porous metal-organic framework (MOF) and a plurality of molecular magnets. The method includes the steps of: forming a first reaction mixture comprising the MOF and a precursor of the plurality of molecular magnets; incubating the first reaction mixture for a period of time sufficient for organization of an intermediate composite magnetic matrix; and incubating the intermediate composite magnetic matrix under conditions suitable for formation of the composite magnetic matrix These and other aspects and embodiments of the invention will be described in greater detail below, and can be further derived from reference to the specification and figures.

BRIEF DESCRIPTION OF THE DRAWINGS

The present invention will be more fully understood and appreciated by reading the following Detailed Description in conjunction with the accompanying drawings, in which.

DETAILED DESCRIPTION OF EMBODIMENTS

Figure 1:
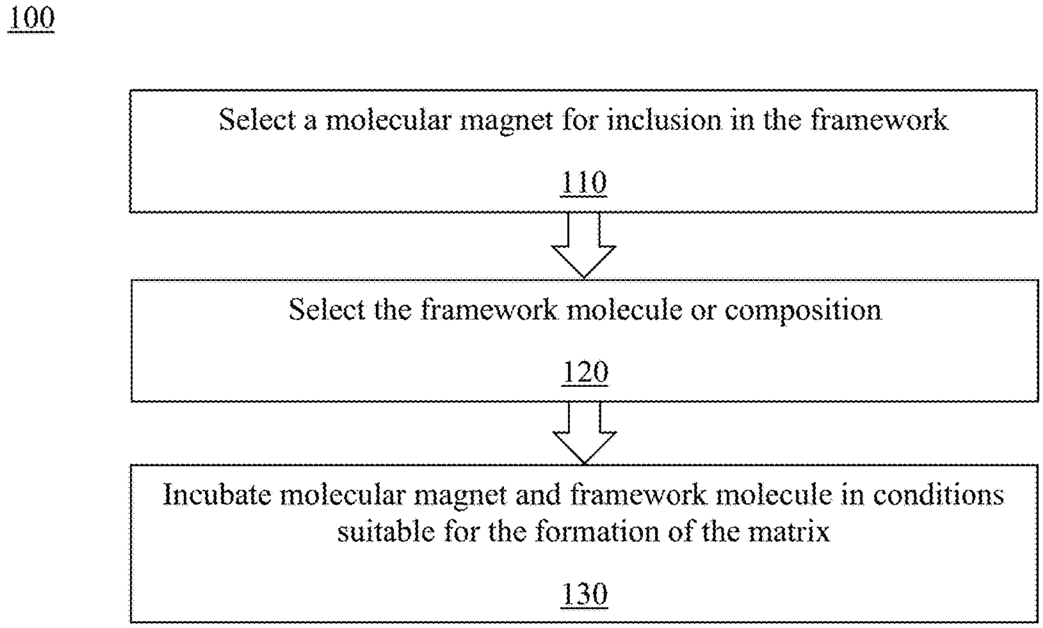
FIG. 1 is a flowchart of a method for the incorporation of a molecular magnet into a metal-organic framework matrix, in accordance with an embodiment.

Referring now to the drawings, wherein like reference numerals refer to like parts throughout, there is seen in FIG. 1 a flowchart of a method 100 for the incorporation of molecular magnets into a framework matrix, in accordance with an embodiment. At step 110 of the method, a molecular magnet is selected for inclusion in the framework molecule matrix. The magnet molecule may be any known or discovered molecular magnet, including but not limited to an SMM and/or an SCM. One suitable molecular magnet, for example, is the SMM $Mn_{12}O_{12}(O_2CCH_3)_{16}(OH_2)_4$ (also known as $Mn_{12}Ac$). Other examples of suitable SMM molecules include $\{Dy_2\}$SMM: $[Dy_2(valdien)_2(L)_2]$.solvent, where $H_2$valdien=N1,N3-bis(3-methoxysalicyldiene) diethylenetriamine, L=$NO_3^-$, $CH_3COO^-$, $ClCH_2COO^-$, $Cl_2CHCOO^-$, $CH_3COCHCOCH_3^-$; $Ni_8$SMM: $\{[Ni_2(mpba)_3][Ni(dpt)(H_2O)]_6\}(ClO_4)_4.12.5H_2O$ where mpba=N,N'1,3-phenylenebis-(oxamate), dpt=dipropylenetriamine; and other members of $Mn_{12}$SMM family: $Mn_{12}O_{12}(O_2CCH_2Br)_{16}(H_2O)_4].4CH_2Cl_2$, $Mn_{12}O_{12}(O_2CCH_2Cl)_{16}(H_2O)_4].2CH_2Cl_2.6H_2O$, $Mn_{12}O_{12}(O_2CCH_2C(CH_3))_{16}$ $(H_2O)_4$, $Mn_{12}O_{12}(O_2CCH_2BU^t)_{16}$ $(MeOH)_4]$.MeOH, $Mn_{12}O_{12}(O_2CCF_3)_{16}(H_2O)_4]$, among others. Examples of SCMs include, but are not limited to, $[Co(NCS)_2(4\text{-}(4\text{-chlorobenzyl)pyridine})_2]_n$, $[Co(NCS)_2(4\text{-acetyl pyridine})_2]_n$, $[Co(NCS)_2(4\text{-ethyl pyridine})_2]_n$, $[Fe(NCSe)_2(pyridine)_2]_n$, $[Co(NCSe)_2(pyridine)_2]_n$, and $[Co(NCS)_2(pyridine)_2]_n$, among others. The molecular magnet may be purchased or manufactured for inclusion in the framework molecule matrix. Selection of the molecular magnet may depend, at least in part, on the framework molecule being utilized for the matrix. Accordingly, steps 110 and 120 may be performed in either order, or may be performed substantially simultaneously.

At step 120 of the method, a framework molecule is selected for inclusion in the matrix. The framework molecule may be any known or discovered framework molecule, including but not limited to a metal-organic framework such as the mesoporous aluminum-based $Al(OH)(SDC)_n$ ($H_2SDC$=4,4'-stilbenedicarboxylic acid), also called CYCU-3. Other examples of suitable framework molecules include MOF-437: $\{[In(BTTB)_{2/3}(OH)](NMF)_5(H_2O)_4\}_n$ where $H_3BTTB$=4,4'4"-[benzene-1,3,5-triyl-tris(oxy)tribenzoic acid, NMF=N-methylformamide; MOF-446: $[Zn_2(ad)(TATAB)O_{1/4}](Me_2NH_2)_{1/2}(DMF)_6(H_2O)_4$ where $H_3TATAB$=4,4'4'-s-triazine-1,3,5-triyltri-p-aminobenzoic acid, ad=adenine; titanium based MOF PCN-22, zirconium based MOFs PCN-222, PCN-225 and PCN-600, among others. The framework molecule may be purchased or manufactured for inclusion in the matrix. Selection of the framework molecule may depend, at least in part, on the molecular magnet being utilized for the matrix. Accordingly, steps 110 and 120 may be performed in either order, or may be performed substantially simultaneously.

At step 130 of the method, a stable framework molecule matrix is created by combining the selected molecular magnet with the selected framework molecule in a reaction suitable for matrix formation. The reaction may be any suitable reaction, including but not limited to the reaction conditions described or otherwise envisioned herein.

According to one embodiment, for example, the MOF CYCU-3 can be incubated in a saturated acetonitrile solution of $Mn_{12}Ac$ and stirred at room temperature for a predetermined amount of time. This results in the formation of the MOF matrix termed $Mn_{12}Ac$@MOF. Many other reaction conditions are possible. For example, the reaction may comprise an organic and/or inorganic solvent, including but not limited to acetonitrile, among others.

According to an embodiment, a solvent-mediated impregnation method was studied. A host-guest model system was selected for study using a prototypical SMM molecule $[Mn_{12}O_{12}(O_2CCH_3)_{16}(OH_2)_4]$, as called $Mn_{12}Ac$, as the guest molecule, and the mesoporous aluminum-based MOF $[Al(OH)(SDC)]_n$ ($H_2SDC$=4,4'-stilbenedicarboxylic acid), also called CYCU-3, as the host framework. The $Mn_{12}Ac$ molecule is a well-studied SMM and exhibits one of the highest reported blocking temperatures as high as 4 K. Its shape can be described as a 1.1×1.6 nm discoid, as shown in FIG. 1A. The MOF CYCU-3 consists of hexagonal 1-D channel pores of ~3 nm diameter, as shown in FIG. 1B, with high thermal and solvent stability. These characteristics indicate that the MOF is well suited for hosting $Mn_{12}Ac$ with the added advantage that the diamagnetic aluminum centers will not influence the overall SMM properties of $Mn_{12}Ac$. Both precursors are readily obtained by low-cost and straightforward syntheses and their crystalline nature allows for the use of modern synchrotron-based X-ray diffraction techniques to analyze their structural properties. The latter is a significant advantage over other reported amorphous mesoporous silica composites.

According to an embodiment, $Mn_{12}Ac$ is successfully arranged into the multidimensional MOF matrix of CYCU-3, including under mild conditions. The new magnetic composite $Mn_{12}Ac$@MOF comprises exactly one molecule per pore in a long-range ordered crystalline matrix, with or without full loading, and fully retains its unique SMM properties while showing a significantly enhanced thermal stability, as shown in FIG. 1B. This arrangement is advantageous for addressing single magnetic moments in potential SMM-based ultrahigh-density data storage systems.

According to an embodiment, different reaction conditions can be utilized to incorporate $Mn_{12}Ac$ into the mesoporous MOF host. For example, according to one variation, the loading of $Mn_{12}Ac$ into the mesoporous MOF host was first performed by soaking CYCU-3 in a saturated acetonitrile solution of $Mn_{12}Ac$. This reaction mixture was stirred at room temperature for 12 h. The resulting composite was removed by filtration and carefully washed with acetonitrile to eliminate any residual $Mn_{12}Ac$ molecules outside the MOF. It was subsequently found that longer reaction times (from 24 h up to one week) and even heating (from 50° C. up to refluxing) does not significantly affect the loading process. The EDX analyses yielded consistent Mn:Al atomic ratios of approximately 20:80 in all of the prepared $Mn_{12}Ac$@MOF composites, corresponding to a 2.1 mol % insertion of $Mn_{12}Ac$ into CYCU-3.

Figure 2A:
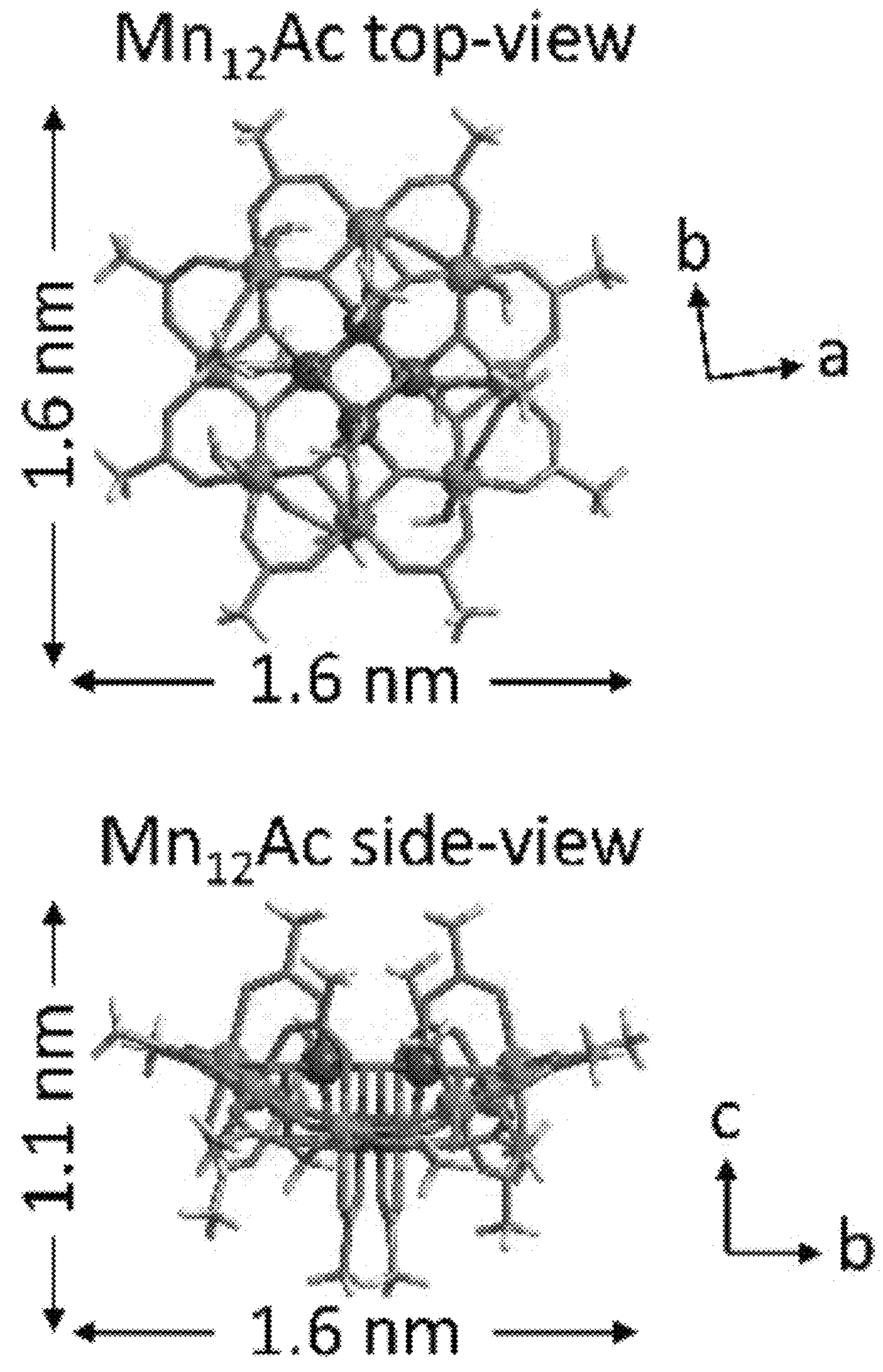
FIG. 2A is a schematic representation of a top view and a bottom view of the SMM $[Mn_{12}O_{12}(O_2CCH_3)_{16}(OH_2)_4]$ molecule, showing the approximately 1.1×1.6 nm discoid shape, in accordance with an embodiment.
Figure 2B:
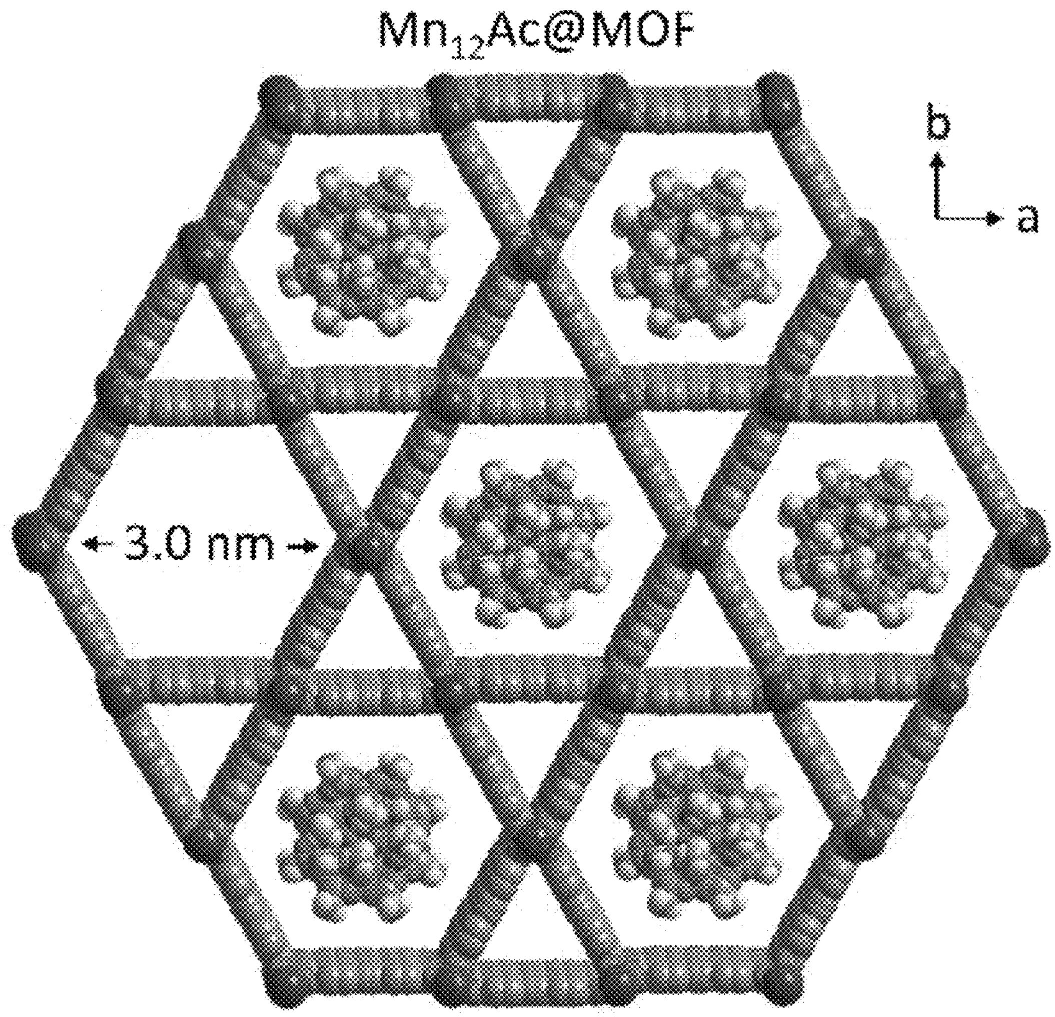
FIG. 2B is a schematic representation of a CYCU-3, a metal-organic framework with hexagonal 1-D channel pores of ~3 nm diameter comprising the SMM guest molecule $[Mn_{12}O_{12}(O_2CCH_3)_{16}(OH_2)_4]$, in accordance with an embodiment.

To examine this composition, three independent experiments were performed, all of which verify that the SMM was effectively adsorbed within the pores of the MOF based on synchrotron-based powder diffraction (SPD) data combined with investigations of the difference envelope density (DED), physisorption analysis (BET surface area and pore size distribution), and thermal analyses (TGA and DSC). The SPD pattern of $Mn_{12}Ac$@MOF did not exhibit any shifts of its reflections as compared to CYCU-3, and, most importantly, reflections ascribed to $Mn_{12}Ac$ or other additional species are absent as evidenced from the high-quality final Le Bail refinements, as shown in FIG. 2A. These results support the conclusion that there is no SMM crystallization on the surface or within the pores of CYCU-3. Furthermore, as compared to CYCU-3, a significant reduction in the intensity of the (100) reflection at ~1.4° 2-theta is observed (ca. 50%) in $Mn_{12}Ac$@MOF, which is attributed to the fact that insertion of scatterers into the pores leads to an increased phase cancellation between scattering from the framework and the pore regions. This observation enables the generation of structure envelopes for CYCU-3 and $Mn_{12}Ac$@MOF generated from SPD data. Their DED clearly shows a hexagonal-shaped density of 11.6 Å diameter as the most intense feature within the center of the meso-pores, which is attributed to the high electron density metal cluster core of $Mn_{12}Ac$, as shown in FIG. 2B. The central nature of this adsorption site leads us to conclude that any specific interactions with the pore walls can be excluded.

Figure 3A:
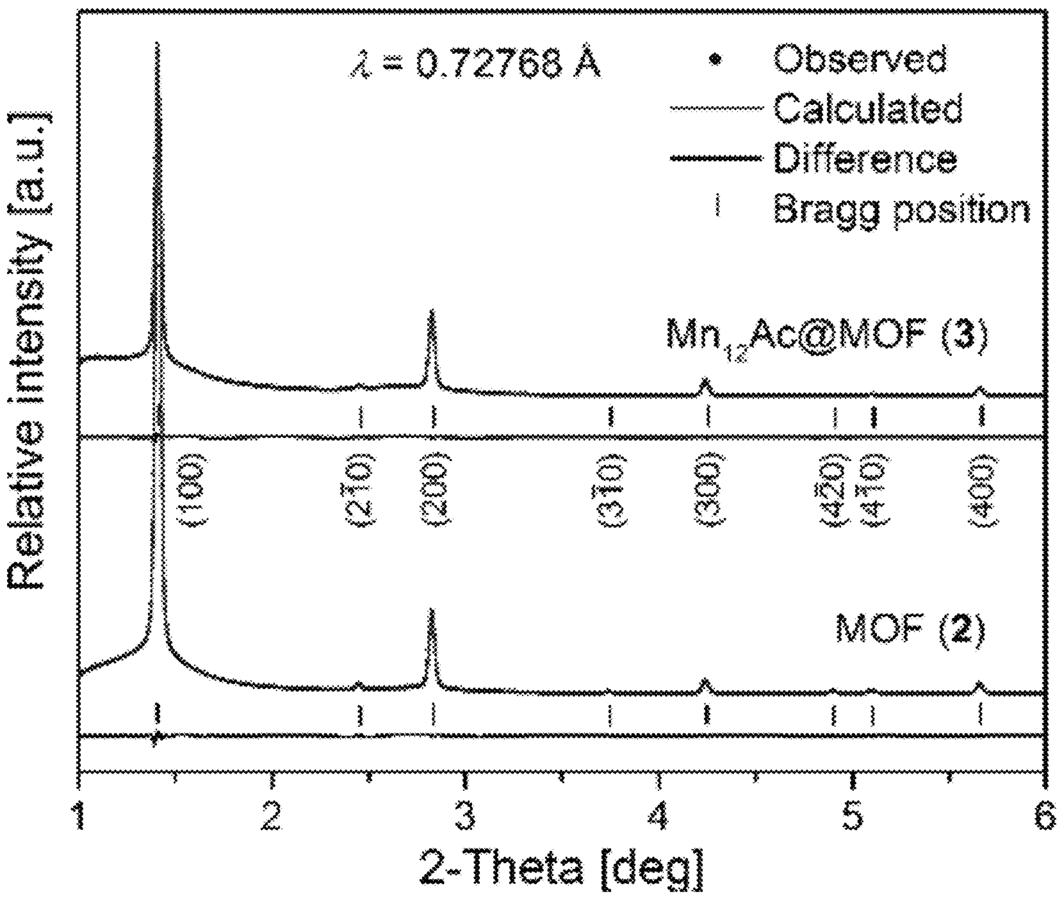
FIG. 3A is a graph of Le Bail whole pattern decomposition plots of CYCU-3 (lower plot) and the composite $Mn_{12}Ac$@MOF (upper plot), in accordance with an embodiment.
Figure 3B:
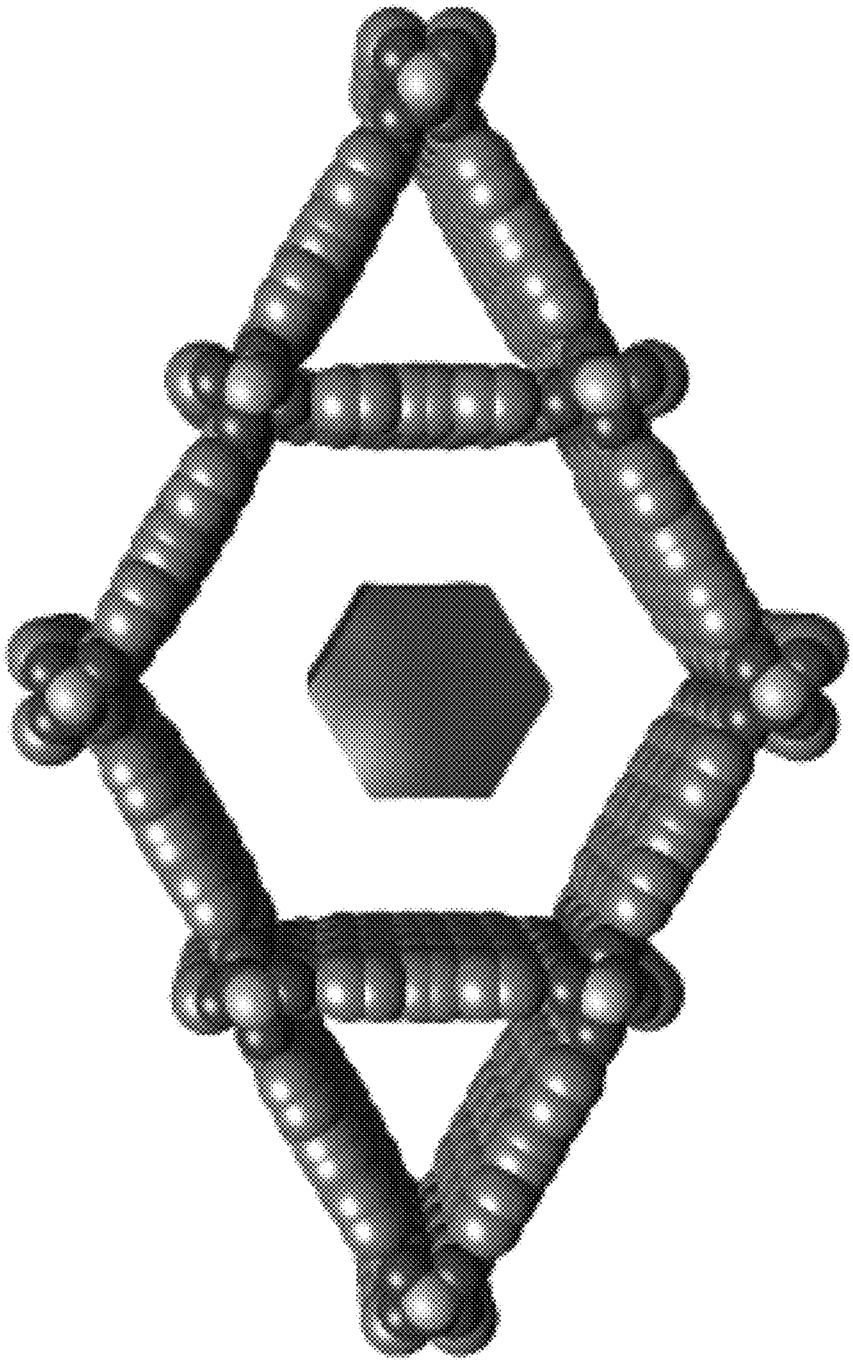
FIG. 3B is a schematic representation of observed structure difference envelope density of $Mn_{12}Ac$@MOF overlapped with a structural model of CYCU-3, in accordance with an embodiment.

Nitrogen adsorption isotherms reveal a reversible type IV behavior with one well-defined step at intermediate partial pressures which corresponds to the capillary condensation inside the mesopores, as shown in FIG. 3A. The BET surface area shows a decrease from 2978.3 $m^2g^{-1}$ in CYCU-3 to 2085.8 $m^2g^{-1}$ in $Mn_{12}Ac$@MOF along with a reduction in the $N_2$ uptake from ~1200 to 800 $cm^3g^{-1}$ STP. The pore size distribution derived from DFT calculations indicates two types of pores, namely micropores (15.0 Å) and mesopores (26.4 Å), results that are consistent with reported data, as shown in FIG. 3B. Upon loading of $Mn_{12}Ac$ into CYCU-3, a significant reduction in the pore volume of the mesopores from 1.70 $cm^3g^{-1}$ in CYCU-3 to 1.18 $cm^3g^{-1}$ in $Mn_{12}Ac$@MOF is observed, whereas the micropores remain unchanged, as shown in FIG. 3B. This indicates that $Mn_{12}Ac$ is solely loaded into the mesopores of 2 as expected due to size exclusion, which is in agreement with the DED analysis in FIG. 2B.

Thermogravimetric analysis of $Mn_{12}Ac$ reveals that the cluster gradually decomposes upon heating to 350° C. with a total mass loss of 50.3%, as shown in FIG. 3C. The decomposition is accompanied by two pronounced exothermic events in the DSC curve, as shown in FIG. 3D. Upon heating 2 to 130° C., a well-defined mass loss step is observed in the TGA curve (FIG. 3C) which is attributed to the loss of two DMF molecules [$\Delta m_{exp}$=32.3% vs. $\Delta m_{calc}$ (2DMF)=32.0%] before decomposition, which is observed at 350° C. The composite $Mn_{12}Ac$@MOF shows a significantly different thermal behavior as compared to its precursors; specifically upon heating to 350° C., a mass loss of only 6.5% was observed, which is in excellent agreement with the 50.3% decomposition of 2.1 mol % of 1 $Mn_{12}Ac$ [$\Delta m_{calc}$ (50.3% of 2.1 mol % $Mn_{12}Ac$)=6.5%]. No additional solvent molecules are incorporated into the framework, as shown in FIG. 3C. Based on the 2.1 mol % loading and the latter observation, it can be assumed that the channel pores of CYCU-3 are loaded with $Mn_{12}Ac$ only at the periphery of the bulk crystals, thereby preventing solvent molecules to enter the remaining internal pores. This arrangement might be advantageous in addressing only single SMM molecules in potential applications. Most importantly, the associated exothermic DSC signal for the decomposition of $Mn_{12}Ac$ is shifted to higher temperatures (~280° C.) as compared to the free molecules (~210° C.), as shown in FIG. 3D. These data indicate that the confinement of $Mn_{12}Ac$ within the nanoscopic cavities of CYCU-3 significantly enhances its thermal stability whereas the overall framework stability remains unchanged.

A series of rigorous control experiments were performed on a physical mixture of $Mn_{12}Ac$ and CYCU-3 with identical atomic Al:Mn ratios as found in $Mn_{12}Ac$@MOF. The same experimental conditions as described above led to an exact overlay of their individual diffraction, adsorption and thermal behaviors as opposed to the composite. These additional experiments further support the successful formation of the composite material $Mn_{12}Ac$@MOF.

Figure 4:
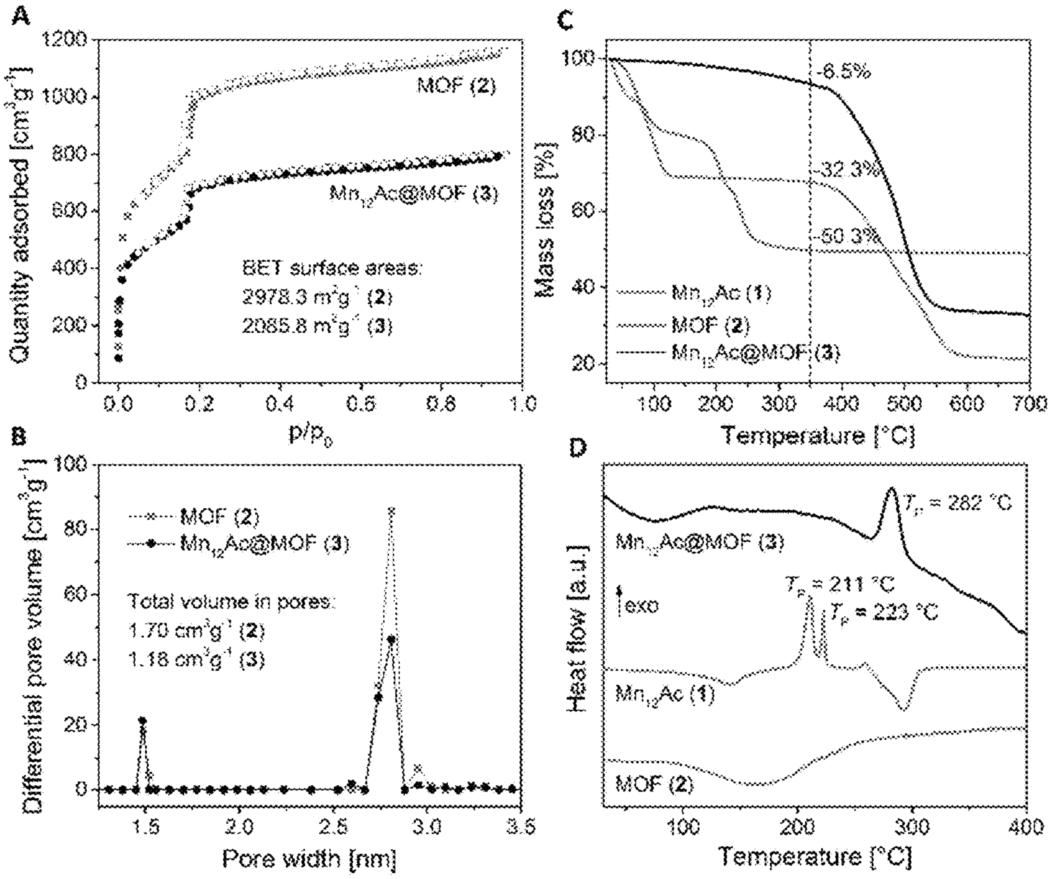
FIG. 4 is a series of graphs of CYCU-3 and $Mn_{12}Ac$@MOF for a variety of analyses, including: A) $N_2$ adsorption (filled symbols) and desorption (open symbols) isotherm; B) density functional theory pore size distributions by differential pore volume; C) TGA curves of $Mn_{12}Ac$, CYCU-3, and $Mn_{12}Ac$@MOF; and D) DSC curves for $Mn_{12}Ac$, CYCU-3, and $Mn_{12}Ac$@MOF.
Figure 5:
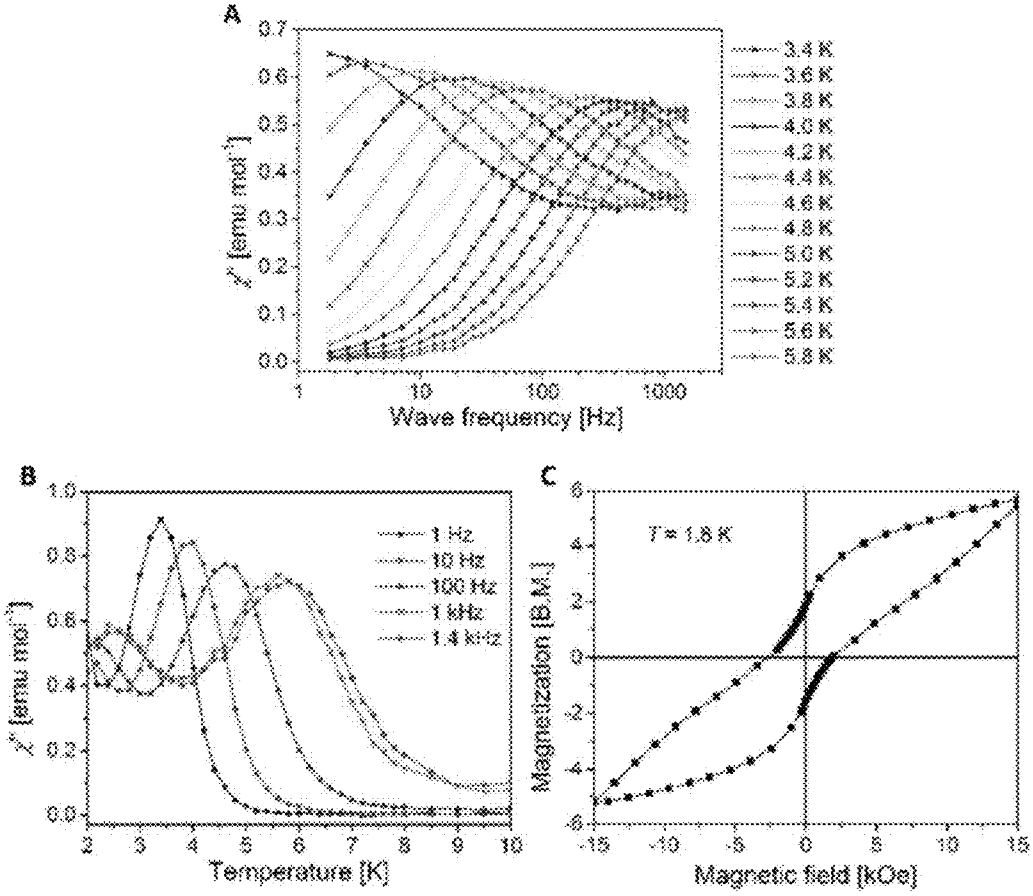
FIG. 5 is a series of graphs including: A) frequency dependence of the out-of-phase ac magnetic susceptibility at different temperatures; B) temperature dependence of the out-of-phase ac magnetic susceptibility at different ac frequencies; and C) field dependent hysteresis of the magnetization.

The magnetic properties of $Mn_{12}Ac$@MOF were extensively investigated. The temperature and frequency dependence of the ac susceptibility data were measured under a zero dc field over the frequency range of 1-1500 Hz. An obvious frequency dependence of the out-of-phase ac susceptibility ($\chi''$) was observed with peaks in the range 3.4-5.8 K which shift to higher temperatures as the frequency increases, a result that is typical of the slow relaxation of the magnetization of $Mn_{12}Ac$, as shown in FIG. 4A. These results support the contention that the $Mn_{12}Ac$ molecules have been preserved during their incorporation into the MOF cavities. A fitting of the $\chi''$ peak temperatures at the corresponding frequencies to the Arrhenius law, $\tau=\tau_0 \exp(\Delta E/k_B T)$, reveals an effective energy barrier of $\Delta E/k_B \neq 57$ K and a pre-exponential factor of $\tau_0 \neq 5.2\times10^{-9}$ s. A control sample of $Mn_{12}Ac$ was also studied to ascertain the influence of the MOF on the SMM properties, the results of which are $\Delta E/k_B \neq 70$ K and $\tau_0 \neq 1.2\times10^{-8}$ s. The slight change in properties is not surprising given the absence of crystallizing solvent molecules and the different environment of the pores. In addition, a minor and faster relaxation process was observed in both $Mn_{12}Ac$ and $Mn_{12}Ac$@MOF, as shown in FIG. 4B, below 3 K which is attributed to an isomer of $Mn_{12}Ac$ with a different Jahn-Teller distortion direction of the Mn(III) ions as reported previously. It is noted that this process is more prominent in $Mn_{12}Ac$@MOF, which may originate from the loss of solvent molecules.

Variable temperature dc magnetic measurements of $Mn_{12}Ac$@MOF at 1000 Oe also exhibit typical behavior for $Mn_{12}Ac$ derivatives. Field dependent magnetization of $Mn_{12}Ac$@MOF exhibits an obvious hysteresis loop with a coercive field of ~2000 Oe (FIG. 4C). A narrowing of the hysteresis loop at low fields is consistent with the presence of quantum tunneling of the magnetization and the presence of the faster relaxation isomer of $Mn_{12}Ac$.

Accordingly, the experiments show that the SMM $Mn_{12}Ac$ can be incorporated into a mesoporous MOF host. The sufficiently large pore size and unreactive interior of the framework facilitates the insertion and preservation of the SMM's unique magnetic properties. Most importantly, amongst other porous composites, it is shown herein that only a single SMM cluster is loaded in the transverse direction of the pores, yielding a long-range ordered crystalline composite material while showing a significantly enhanced thermal stability.

Synthesis of $Mn_{12}Ac$, CYCU-3, and $Mn_{12}Ac$@MOF

All reagents and solvents were used without further purifications. The precursors $Mn_{12}Ac$ and CYCU-3 were synthesized as previously reported. The purities of bulk materials were confirmed by X-ray powder diffraction. The incorporation of $Mn_{12}Ac$ into CYCU-3 was performed by adding 0.1 g of CYCU-3 to a saturated solution of $Mn_{12}Ac$ in dry acetonitrile under a $N_2$ atmosphere. The mixture was stirred at room temperature in a closed vial for 12 hours. The resulting brown powder was filtered, washed with acetonitrile until the filtrate became colorless, and dried at room temperature.

General Analytical Techniques

PXRD data was recorded on a Bruker D2 Phaser diffractometer equipped with a Cu sealed tube ($\lambda$=1.54178 Å). Powder samples were dispersed on low-background discs for analyses. TEM images were taken by a JEOL JEM 2010F at an accelerating voltage of 200 kV. EDX analyses were performed with a Thermo NORAN System Six EDS coupled to a JEOL JSM-7400F field-emission scanning electron microscope (FESEM) set to an acceleration voltage of 15 kV and a working distance of 8 mm. Thermogravimetric data were recorded using a TGA Q50 from TA Instruments. All measurements were performed using platinum crucibles in a dynamic $N_2$ atmosphere (50 mL $min^{-1}$) over the range of 25-700° C. with a heating rate of 3° C. $min^{-1}$. DSC data were recorded using a TGA Q20 from TA Instruments. All measurements were performed using T zero aluminum pans, a dynamic $N_2$ atmosphere (50 mL $min^{-1}$) over the range of 25-400° C. at a heating rate of 3° C. $min^{-1}$. Gas adsorption isotherms for pressures in the range from $1\cdot10^{-5}$ to 1 bar were measured by a volumetric method using a Micromeritics ASAP2020 surface area and pore analyzer. For all isotherms, warm and cold free-space correction measurements were performed using ultra-high purity He gas (UHP grade 5.0, 99.999% purity). $N_2$ (99.999% purity) isotherms at 77 K were measured in liquid nitrogen. All temperatures and fill levels were monitored periodically throughout the measurement. Oil-free vacuum pumps and oil-free pressure regulators were used for all measurements to prevent contamination of the samples during the evacuation process or of the feed gases during the isotherm measurements. Elemental analyses (C, H, and N) were performed at Atlantic Microlab, Inc. FT-IR data were recorded on a Nicolet iS10 from Thermo Scientific. $^1$H-NMR data were recorded on Avance DMX-400 from Bruker.

EDX and TEM Analysis of $Mn_{12}Ac$@MOF

Transmission electron microscope (TEM) images were measured with a JEOL JEM 2010F at an accelerating voltage of 200 kV. EDX analyses were performed with a Thermo NORAN System Six EDS coupled to a JEOL JSM-7400F field-emission scanning electron microscope. EDX analyses were carried out over different spots in different areas. The elemental percentages of Al and Mn at various spots are averaged to 79.58 and 20.42% respectively.

Synchrotron-Based Structure Envelope Studies

The powder diffraction patterns were recorded on the 17BM beamline at the Advanced Photon Source, Argonne National Laboratory (Argonne, Ill., USA). The incident X-ray wavelength was 0.72768 Å. Data were collected using a Perkin-Elmer flat panel area detector (XRD 1621 CN3-EHS) over the angular range 1-11° 2-Theta. The data reveal that the crystallinity and the structure of the MOF framework remain intact upon SMM loading. The unit cell parameters of activated and SMM-loaded samples differ only very slightly. A Rietveld analysis cannot be applied to estimate position of $Mn_{12}Ac$ inside the cavities of CYCU-3 due to the size of the framework and low occupancy of the guest molecules. Instead the Difference Envelope Density $\rho\Delta$ method was applied. This method was very successful for the estimation of MOF guest molecule positions and requires only a few reflection intensities which can be obtained from PXRD data.

Generation of Envelope Difference Density Map

Le Bail refinements were performed in Jana2006 using the initial unit-cell parameters (a=34.067, b=60.07, c=6.312 Å) and space group C mcm which were taken from a previous publication. During the refinement process it was noted that under each single reflection in the pattern two very close Bragg peak positions are present. This suggests that the structure and/or unit cell might contain missing symmetry. Subsequent investigations with the ADDSYM function in PLATON confirmed this assumption and revealed that structure can be transferred to a hexagonal symmetry with unit cell parameters a=34.298, c=6.312Å and space group P $6_3$/mmc which were used as a starting parameters in the new Le Bail refinements. The unit cell parameters, zero-point shift, background, and peak profile (pseudo-Voigt) were refined. After refinement using the hexagonal symmetry settings, it was found that each reflection in the powder pattern contains only one Bragg peak position. Upon the reach of satisfactory profile fits and R-factors were extracted and used for generation of Structure Envelope (SE) Densities.

For calculation of structure factor phases, the structural model of CYCU-3 was transferred to the hexagonal space group P $6_3$/mmc. The ideal intensities for this structure were calculated with the XFOG program using the SHELXTL software package. Using these intensities, the structure factor phases for the reflections were generated with LIST 2 instruction in the INS-file via SHELXL software.

Generation and Visualization of Envelope Densities. Reflections {100}, {2-10}, {200}, {310}, {300}, {4-20}, {4-10}, {400}, {5-10} {101}, {6-30}, {6-10} and {600} were chosen for SE densities generation in both cases. The combination of corresponding $F_{obs}^2$ of and $\varphi_{hkt}^{calc}$ were used for generation of envelope densities $\rho_{act}$ and $\rho_{SMM@MOF}$ for activated and SMM-loaded samples. SE densities were produced by SUPERFLIP software in XPLOR format and visualized with UCSF Chimera software.

Difference Envelope Density $\rho\Delta$ was generated as previously reported. However, due to the fact that the structure of CYCU-3 was reported with missing symmetry, instead of finding the difference between envelope densities of $Mn_{12}$Ac@MOF $\rho_{SMM@MOF}$ and ideal (or calculated) $\rho_{calc}$ of CYCU-3, we performed subtraction between $\rho_{SMM@MOF}$ and envelope density for the activated sample of CYCU-3 $\rho_{act}$. The subtraction between SE densities and visualization of $\rho\Delta$ were completed in UCSF Chimera software via "vop subtract" command. The scaling factor for the subtraction was calculated as quotient of maximum values of $\rho_{SMM@MOF}$ and $\rho_{act}$. The cutoff of $\rho\Delta$ was chosen to be 1.5 of the standard deviation a which is in accord with a previous reported method.

Magnetic Characterization

Magnetic measurements were carried out on a Quantum Design MPMS XL SQUID magnetometor over the temperature range of 1.8-300K. AC magnetic susceptibility data were collected with an oscillating measuring field of 5 Oe in the frequency range of 1-1500 Hz. The diamagnetic contributions of the atoms and sample holders were accounted for with the Pascal's constants.

Other Possible Composite Materials

Both the size and surface reactivity of the porous host materials may influence the incorporation of $Mn_{12}$Ac into porous materials, as the insertion of $Mn_{12}$Ac in the mesoporous silica SBA-15 with a 25 Å pore size was not successful, whereas SBA-15 with a much larger pore size of 60 Å was able to accommodate molecules of $Mn_{12}$Ac that exhibit only one relaxation process but the molecules can be re-orientated by an external magnetic field due to the rotational freedom in the larger pores. Graphitized multi-walled carbon nanotubes with pore sizes of about 56 Å were able to encapsulate $Mn_{12}$Ac to show a large degree of the orientational ordering and two slow relaxation processes; in another case, when the mesoporous silica MCM-41 with a pore size of 25.8 Å was employed, $Mn_{12}$Ac was successfully impregnated in the pores but the magnetic properties are different from the pristine crystalline powder of $Mn_{12}$Ac. The hysteresis loop of Mn12Ac@MCM-41 is much narrower and the $\chi_M T$ vs. T curve did not show any noticeable increase at low temperatures, which was attributed to the possible substitution of the acetate groups by silanol groups of the silica walls. Therefore, compatible pore sizes and inactive pore surfaces are essential for the incorporation and preservation of $Mn_{12}$Ac SMMs in porous materials.

Figure 6:
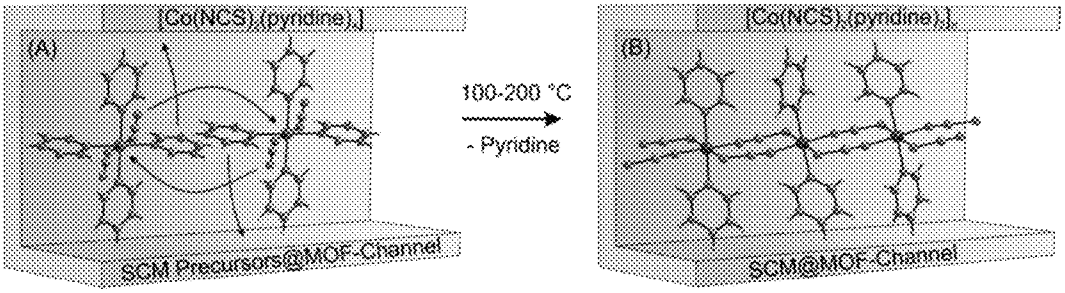
FIG. 6 is a schematic thermal decomposition reaction in a one-dimensional MOF-channel of a representative SCM precursor $[Co(NCS)_2(pyridine)_4]$ (A) to form the SCM $[Co(NCS)_2(pyridine)_2]_n$(B), in accordance with an embodiment.
Figure 7:
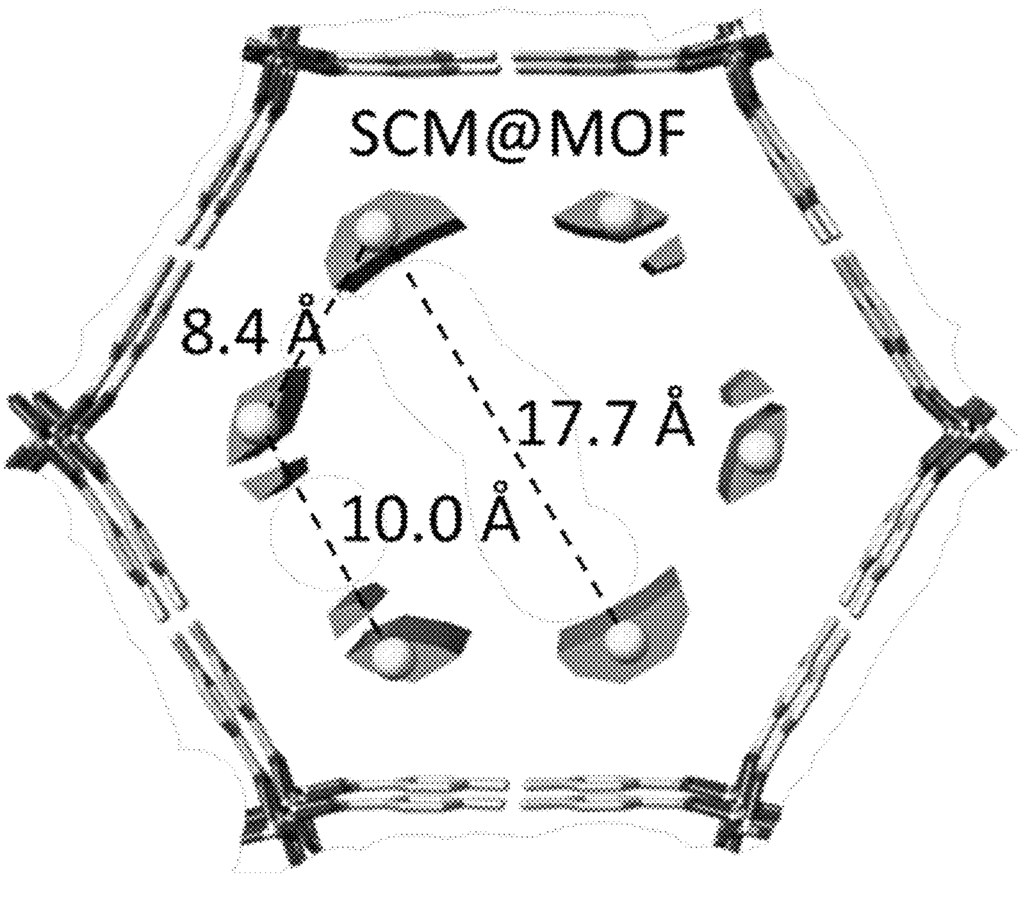
FIG. 7 is a schematic representation of difference envelope density data for SCM@MOF, in accordance with an embodiment.

According to one embodiment, for example, the MOF is combined with an SCM. The incorporation of SCMs into MOF pores is challenging. Due to their polymeric nature, SCMs are not soluble in common organic solvents and thus, the approach used for SMMs is not applicable to this undertaking. Accordingly, thermal decomposition reactions can be exploited as a route for in situ generation of SCMs within the defined cavities of MOFs. In the first step of the method for solvent-mediated impregnation of SCM precursors into MOF pores, the soluble discrete SCM precursor complex (such as $Co(NCS)_2(pyridine)_4$, according to one example embodiment) is loaded into the pores of MOF (such as CYCU-3) mediated by solvent. This complex is composed of a central cobalt(II) cation terminally coordinated by two thiocyanate anions and four neutral pyridine ligands in an octahedral geometry. The next step is thermal decomposition of the SCM precursors and in situ formation of the SCM. Upon application of a controlled heating program, two of the pyridine ligands are liberated, enabling the thiocyanates to bridge the metals centers in a μ-1,3 fashion to quantitatively yield one-dimensional chains of $[Co(NCS)_2(pyridine)_2]_n$ exhibiting SCM behavior, as shown in FIG. 6. This structural transformation can be easily monitored by IR/Raman spectroscopy, as a significant shift in the N≡C stretch is observed upon transitioning from the terminal coordination mode (<2070 $cm^{-1}$) to the μ-1,3 bridging (>2090 $cm^{-1}$). From additional difference envelope density (DED) analysis it is evident that six SCM chains are hexagonally aligned within the pores, as shown in FIG. 7. Other methods of incorporating SCMs into MOF pores are also possible.

Although the present invention has been described in connection with a preferred embodiment, it should be understood that modifications, alterations, and additions can be made to the invention without departing from the scope of the invention as defined by the claims.

What is claimed is:

1. A composite magnetic matrix comprising: (i) a porous metal-organic framework (MOF); and (ii) a plurality of molecular magnets, wherein a plurality of pores of the MOF each comprise one of the plurality of molecular magnets, and wherein the each of the plurality of molecular magnets retains its magnetic properties in the matrix.

2. The composite magnetic matrix of claim 1, wherein the MOF is $[Al(OH)(SDC)]_n$ ($H_2$SDC=4,4'-stilbenedicarboxylic acid) (CYCU-3).

3. The composite magnetic matrix of claim 1, wherein the molecular magnet is a single-molecule magnet.

4. The composite magnetic matrix of claim 3, wherein the single-molecule magnet is $Mn_{12}O_{12}(O_2CCH_3)_{16}(OH_2)_4$.

5. The composite magnetic matrix of claim 1, wherein the molecular magnet is a single-chain magnet.

6. A material comprising a composite magnetic matrix, the composite magnetic matrix comprising: (i) a porous metal-organic framework (MOF); and (ii) a plurality of molecular magnets, wherein a plurality of pores of the MOF each comprise one of the plurality of molecular magnets, and wherein the each of the plurality of molecular magnets retains its magnetic properties in the matrix.

7. A method for organizing a plurality of molecular magnets into an ordered matrix, comprising the steps of:

providing a porous metal-organic framework (MOF); and combining the MOF with the plurality of molecular magnets; and wherein the each of the plurality of molecular magnets retains its magnetic properties in the matrix.

8. The method of claim 7, wherein the MOF is $[Al(OH)(SDC)]_n$, ($H_2SDC$=4,4'-stilbenedicarboxylic acid) (CYCU-3).

9. The method of claim 7, wherein the molecular magnet is a single-molecule magnet.

10. The method of claim 9, wherein the single-molecule magnet is $Mn_{12}O_{12}(O_2CCH_3)_{16}(OH_2)_4$.

11. The method of claim 7, wherein the molecular magnets is a single-chain magnet.

12. A method for preparing a composite magnetic matrix comprising a porous metal-organic framework (MOF) and a plurality of molecular magnets, the method comprising the steps of:

forming a first reaction mixture comprising the MOF and the plurality of molecular magnets; and incubating the first reaction mixture for a period of time sufficient for organization of the composite magnetic matrix.

13. The method of claim 12, wherein the MOF is $[Al(OH)(SDC)]_n$ ($H_2SDC$=4,4'-stilbenedicarboxylic acid) (CYCU-3).

14. The method of claim 12, wherein the molecular magnet is a single-molecule magnet.

15. The method of claim 14, wherein the single-molecule magnet is $Mn_{12}O_{12}(O_2CCH_3)_{16}(OH_2)_4$.

16. The method of claim 12, wherein the molecular magnet is a single-chain magnet.

17. The method of claim 12, wherein the first reaction mixture comprises a solvent.

18. The method of claim 17, wherein the method further comprises the step of removing the solvent from the reaction mixture after organization of the composite magnetic matrix.

19. The method of claim 12, further comprising the step of heating the composite magnetic matrix.

20. A method for preparing a composite magnetic matrix comprising a porous metal-organic framework (MOF) and a plurality of molecular magnets, the method comprising the steps of:

forming a first reaction mixture comprising the MOF and a precursor of the plurality of molecular magnets;

incubating the first reaction mixture for a period of time sufficient for organization of an intermediate composite magnetic matrix; and incubating the intermediate composite magnetic matrix under conditions suitable for formation of the composite magnetic matrix.

* * * * *